(12) United States Patent
Leonard et al.

(10) Patent No.: US 8,497,852 B2
(45) Date of Patent: Jul. 30, 2013

(54) MINIMAL PARALLAX COINCIDENT DIGITAL DRAWING AND DISPLAY SURFACE

(75) Inventors: Edwin R. Leonard, Glendora, CA (US); Hans T. Ku, La Canada Flintridge, CA (US)

(73) Assignee: DreamWorks Animation LLC, Glendale, CA (US)

( * ) Notice: Subject to any disclaimer, the term of this patent is extended or adjusted under 35 U.S.C. 154(b) by 196 days.

(21) Appl. No.: 13/229,453

(22) Filed: Sep. 9, 2011

(65) Prior Publication Data

US 2013/0063363 A1    Mar. 14, 2013

(51) Int. Cl.
*G06F 3/041* (2006.01)
(52) U.S. Cl.
USPC ............................................. 345/178
(58) Field of Classification Search
USPC ............... 345/178, 173, 420, 426, 473, 589, 345/619; 382/154; 348/39
See application file for complete search history.

(56) References Cited

U.S. PATENT DOCUMENTS

| | | | |
|---|---|---|---|
| 5,448,287 A * | 9/1995 | Hull | 348/39 |
| 5,854,634 A * | 12/1998 | Kroitor | 345/473 |
| 5,966,134 A * | 10/1999 | Arias | 345/589 |
| 6,373,492 B1 * | 4/2002 | Kroitor | 345/473 |
| 6,395,863 B2 | 5/2002 | Geaghan | |
| 6,559,842 B1 * | 5/2003 | Deering et al. | 345/420 |
| 6,577,315 B1 * | 6/2003 | Kroitor | 345/473 |
| 6,683,619 B1 * | 1/2004 | Samra | 345/619 |
| 6,828,984 B2 * | 12/2004 | Samra | 345/619 |
| 8,217,940 B2 * | 7/2012 | Burley et al. | 345/426 |
| 2003/0016222 A1 * | 1/2003 | Budin et al. | 345/473 |
| 2005/0164148 A1 | 7/2005 | Sinclair | |
| 2011/0222757 A1 * | 9/2011 | Yeatman et al. | 382/154 |

FOREIGN PATENT DOCUMENTS

WO    2011/027034 A1    3/2011

OTHER PUBLICATIONS

"Cintiq Pen Displays: Work Directly on Screen", Wacom Americas, Available on Internet, retrieved on Oct. 13, 2011, 3 pages, available at: http://www.wacom.com/en/Products/Cintiq.aspx.

"Genee Touch: Interactive LCD screen for integrated interaction", Genee Solutions India Pvt. Ltd., Available on Internet, viewed on Oct. 13, 2011, 2 pages, available at: http://www.genee-india.com/downloads/product-literature/Genee_Touch.pdf.

* cited by examiner

*Primary Examiner* — Fred Tzeng
(74) *Attorney, Agent, or Firm* — Morrison & Foerster LLP (57) ABSTRACT

A drawing table for an animator to hand create or modify a computer-generated image includes a display and a fused fiber optic plate. The display is configured to display the computer-generated image on a top surface. The fused fiber optic plate of bundled, optical fibers has an input surface and an output surface. The input surface is optically bonded to the top surface of the display. When the computer-generated image is displayed on the display, the fused fiber optic plate is configured to relay the computer-generated image from the input surface to the output surface.

24 Claims, 7 Drawing Sheets

MINIMAL PARALLAX COINCIDENT DIGITAL DRAWING AND DISPLAY SURFACE

BACKGROUND

1. Field

This application relates generally to a drawing table for creating or modifying a computer-generated image, and, more specifically, to a drawing table configured to reduce parallax error.

2. Related Art

In traditional animation, the individual frames of a film are photographs of drawings, which are first drawn on paper. To create the illusion of movement, each drawing differs slightly from the one before it. The completed drawings are then photographed onto motion picture film.

Traditional, paper-drawn animation has been enhanced by computer systems. Drawings are either scanned instead of photographed or drawn directly into a computer system. However, unlike paper and pencil, when drawing directly into a computer system, the input device, such as a stylus or finger, is separated from the actual drawing.

Figure 1:
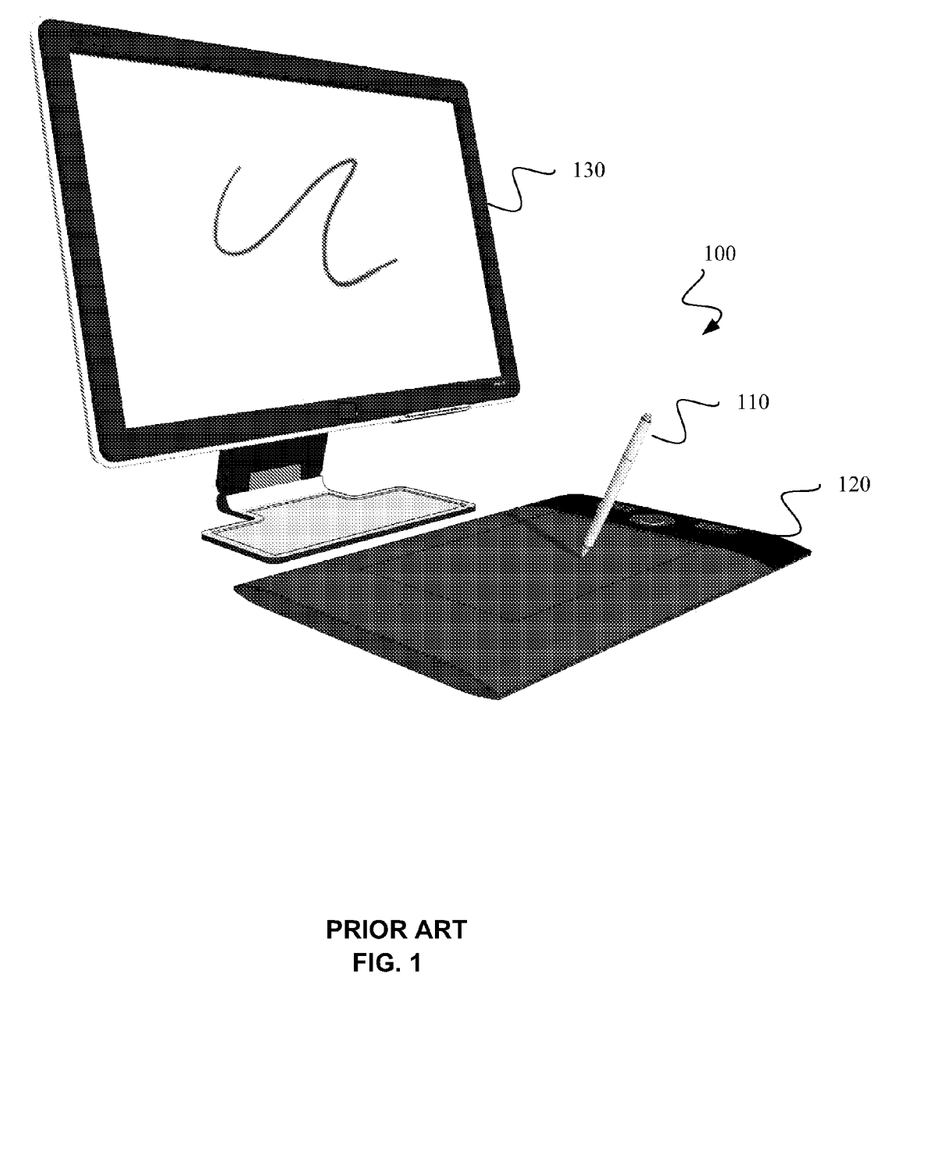
FIG. 1 illustrates a drawing tablet.

For example, FIG. 1 shows a drawing table 100 used to create or modify a computer-generated image. When an animator moves stylus 110 on tablet 120, the computer-generated image drawn by the animator appears on display 130. The coordinates of stylus 110 on tablet 120 are translated to coordinates on display 130. However, stylus 120 is completely separated from the actual computer-generated image displayed on display 130. Thus, detailed, fine shading and accurate placement of lines may be difficult to achieve.

In some drawing tables, the tablet and the display are integrated to allow an animator to draw directly on the display. However, the display typically has a barrier above the surface on which the computer-generated image is actually displayed. This barrier creates a perceptible thickness between the tip of the stylus and the computer-generated image on the display, preventing the tip of the stylus from touching the computer-generated image underneath and introducing parallax error between them.

SUMMARY

In one exemplary embodiment, a drawing table for an animator to hand create or modify a computer-generated image includes a display and a fused fiber optic plate. The display is configured to display the computer-generated image on a top surface. The fused fiber optic plate of bundled, optical fibers has an input surface and an output surface. The input surface is optically bonded to the top surface of the display. When the computer-generated image is displayed on the display, the fused fiber optic plate is configured to relay the computer-generated image from the input surface to the output surface.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 2:
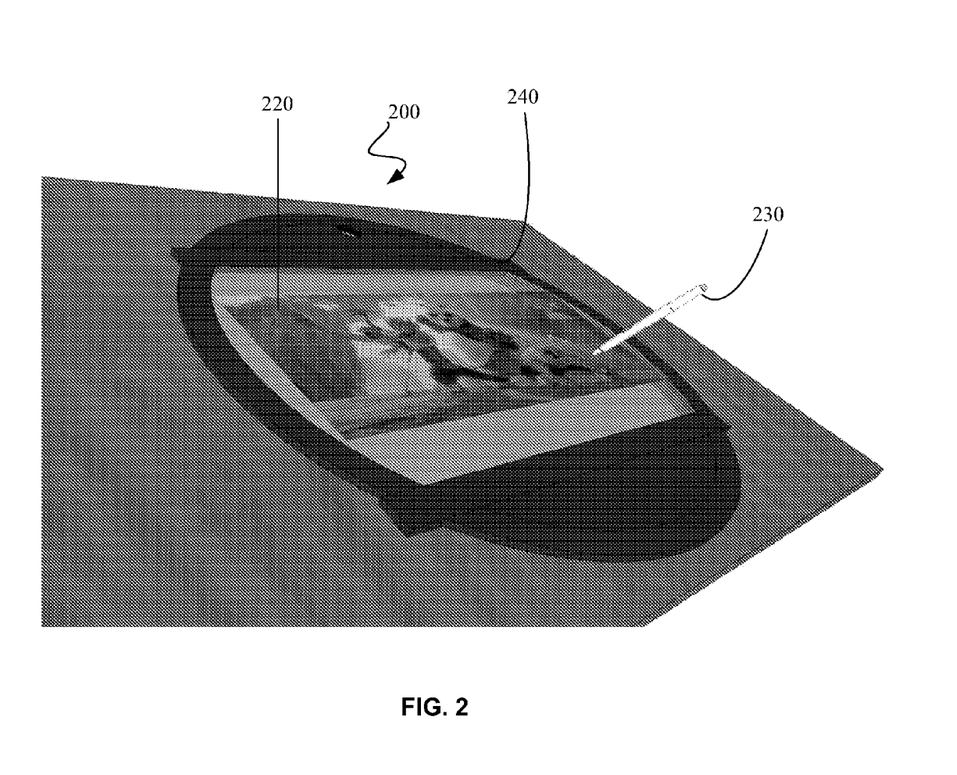
FIG. 2 illustrates an exemplary drawing table for an animator to create or modify a computer-generated image.

FIG. 2 depicts an exemplary drawing table 200 for an animator to create or modify a computer-generated image 220. As described in more detail below, drawing table 200 is configured to reduce the parallax between stylus 230 and the computer-generated image 220 displayed on display screen 240. In this way, the digital drawing experience more closely models pen and paper drawing, where the pen is in direct contact with the image on the paper.

Figure 3A:
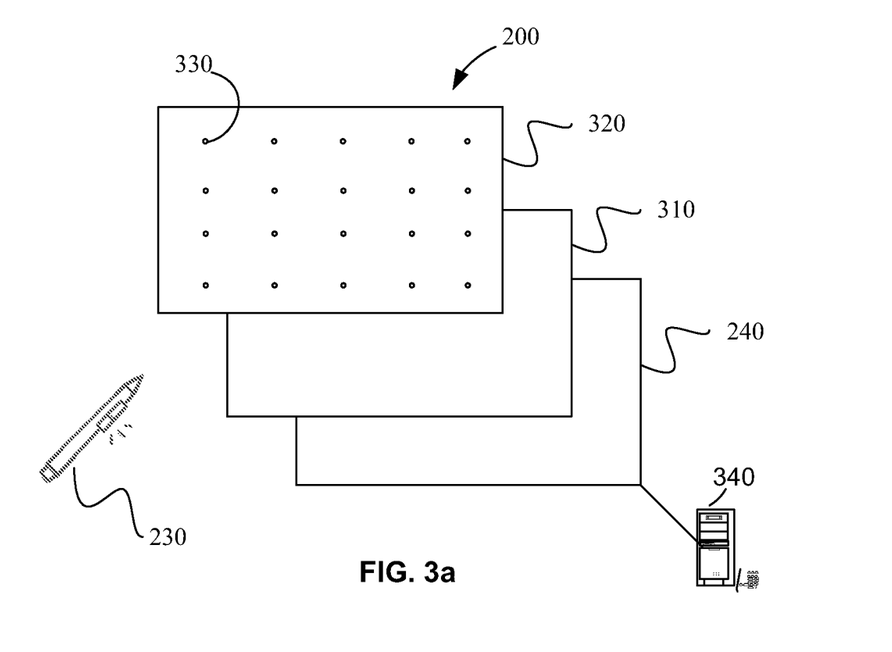
FIGS. 3a and 3b illustrate an exemplary representation of a system for creating digital content.

In the present exemplary embodiment, as depicted in FIG. 3a, drawing table 200 includes a fused fiber optic plate 310 disposed on top of display 240. As will be described in more detail below, fused fiber optic plate 310 is configured to relay the computer-generated image from a bottom surface, which is in direct contact with display screen 240, to a top surface, with which the animator can made direct contact with a stylus.

Figure 4A:
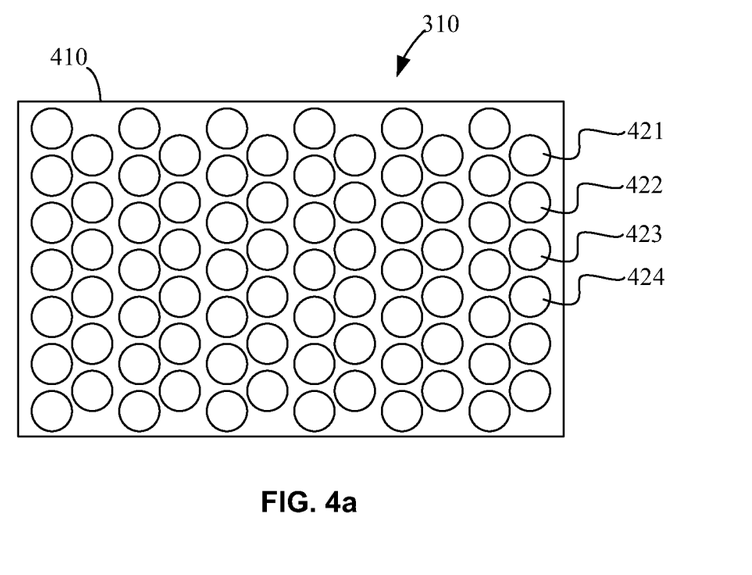
FIGS. 4a and 4b illustrate an exemplary representation of a fused fiber optic plate.
Figure 4B:
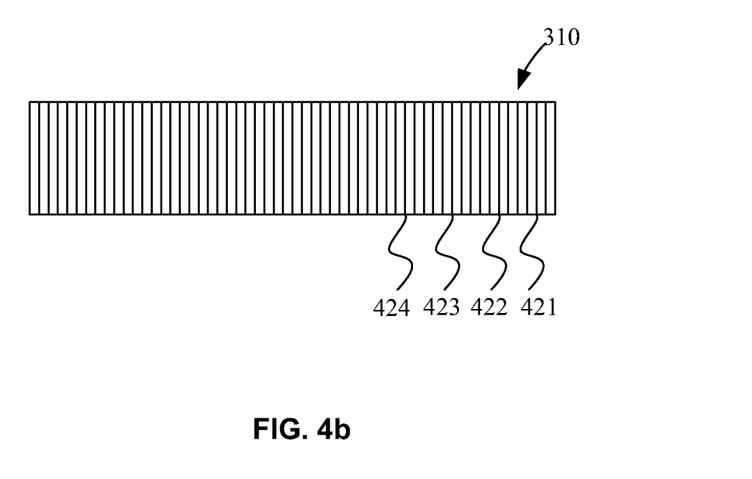

As depicted in FIGS. 4a and 4b, fused fiber optic plate 310 includes optical fibers 421-424. Optical fibers 421-424 may be gathered into groups of optical fibers to form bundles. Upon heating, the bundles of fibers may be further drawn and pressed. The pressed, drawn, and stacked fiber bundles may then be consolidated to form fused fiber optic plate 310. Fused fiber optic plate 310 may have parallel oriented fibers 421-424, which transmit light from an input (e.g., bottom surface) to an output (top surface) of plate 410, fiber by fiber (e.g., pixel by pixel). In this way, fused fiber optic plate 310 is configured to transmit an image from its input surface (e.g., bottom surface) to its output surface (e.g., top surface).

Referring back to FIG. 3a, in the present exemplary embodiment, the input surface of fused fiber optic plate 310 is placed directly on display 240. To ensure that fused fiber optic plate 310 is as close to display 240 as possible, any protective films, coatings, or the like may be removed from display 240. Fused fiber optic plate 310 may then be optically bonded to display 240. Fused fiber optic plate 310 may serve as a protective cover to display 240, distributing the force of stylus 230 when pressure is applied and protecting display 240 from damage.

In the present exemplary embodiment, transparent sheet 320 is placed on top of fused fiber optic plate 310. It should be recognized that transparent sheet 320 may be slightly opaque rather than absolutely transparent.

When stylus 230 is used as the input device, transparent sheet 320 is imprinted with infrared ink dots 330. Infrared ink dots 330 are configured to provide location information to stylus 230. For example, the tip of stylus 230 may include an infrared camera that detects infrared ink dots. Infrared ink dots 330 may be arranged in a pattern, such that each section of the pattern uniquely defines a location on the transparent sheet 320. Stylus 230 can track the pattern of infrared ink dots 330 on transparent sheet 320 that are near the tip of stylus 230 to determine the stylus's positional information, such as location, path, or the like, across transparent sheet 320. Infrared styluses and dot patterns are commercially available by, for example, Anoto and LiveScribe.

Stylus 230 may be connected to a storage device, such as computing system 340 or the like, and transmit the positional information to the storage device. Computing system 340 may alter the image of display 240 based on the positional information from stylus 230. Alternatively, stylus 230 may transmit the information to another storage device, or store the information for later upload. Stylus 230 also may be connected to the storage device via a wireless or wired connection.

It should be recognized that transparent sheet 320 may be omitted. Instead, infrared ink dots 330 may be printed directly on fused fiber optic plate 310.

Figure 3B:
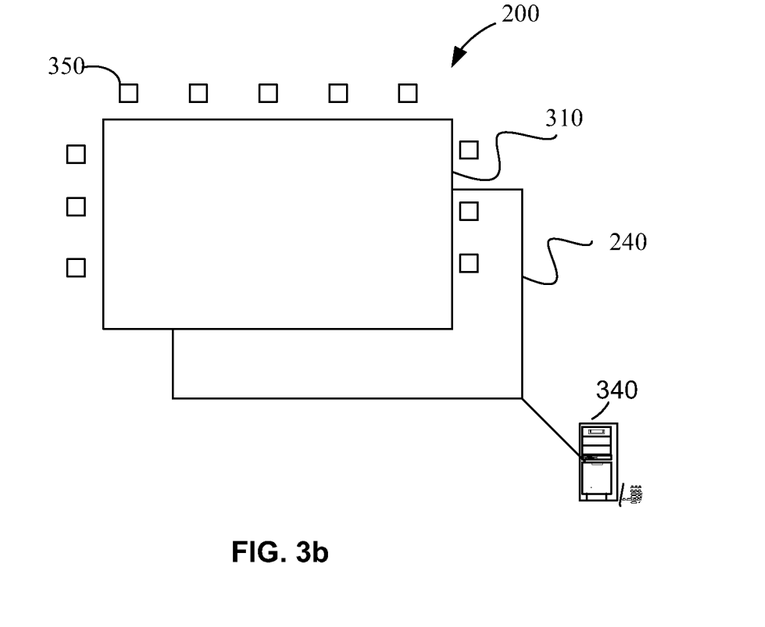

As depicted in FIG. 3b, in another exemplary embodiment, drawing table 200 can employ touch technology. For example, touchscreen sensors 350 (e.g., infrared sensors, acoustic sensors, dispersive signal sensors, or the like) may be disposed on—such as around the edges of—fused fiber optic plate 310. Touchscreen sensors 350 may be coupled to a storage device, such as computing system 340 or the like, and transmit the positional information to the storage device.

It should be recognized that infrared ink dots 330 (FIG. 3a) can be used in conjunction with touch technology. For example, fused fiber optic plate 310 may be imprinted with infrared ink dots 330 (FIG. 3a) with touchscreen sensors 350 disposed around its edges.

Figure 5A:
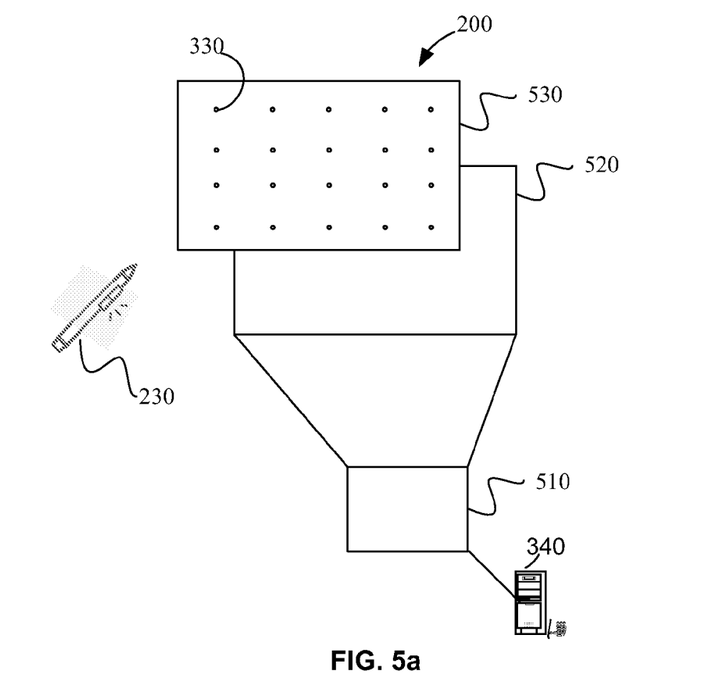
FIGS. 5a and 5b illustrate another exemplary representation of a system for creating or modifying digital content.

With reference to FIG. 5a, in another exemplary embodiment, drawing desk 200 includes projector 510, glass plate 520, and sheet 530. As will be described below in more detail, in this exemplary embodiment, the distance between the input device (e.g., tip of stylus 230) and the image may be reduced by projecting the image directly onto a surface (sheet 530) upon which the input device is used.

In particular, projector 510 is configured to project the image onto glass plate 520. Projector 510 is depicted in FIG. 5a as a rear-projection projector. Projector 510 may be coupled to computing system 340, which provides the image to be displayed.

Sheet 530 is placed on top of glass plate 520. Sheet 530 may be any sheet that is transmissive enough to allow the projected image to be displayed on its surface without an undesirable amount of blurring from diffusion of the projected images. Examples include animation paper, tracing paper, or the like. In the present exemplary embodiment, sheet 530 is imprinted with infrared ink dots 330. As discussed above, infrared ink dots 330 provide positional information to stylus 230. Stylus 230 is connected to a storage device, such as computing system 340 or the like, and transmits the positional information to the storage device. Computing system 340 may alter the image based on the positional information from stylus 230. Alternatively, stylus 230 may transmit the information to another storage device, or store the information for later upload. Stylus 230 may be connected to the storage device via a wireless or wired connection.

Figure 5B:
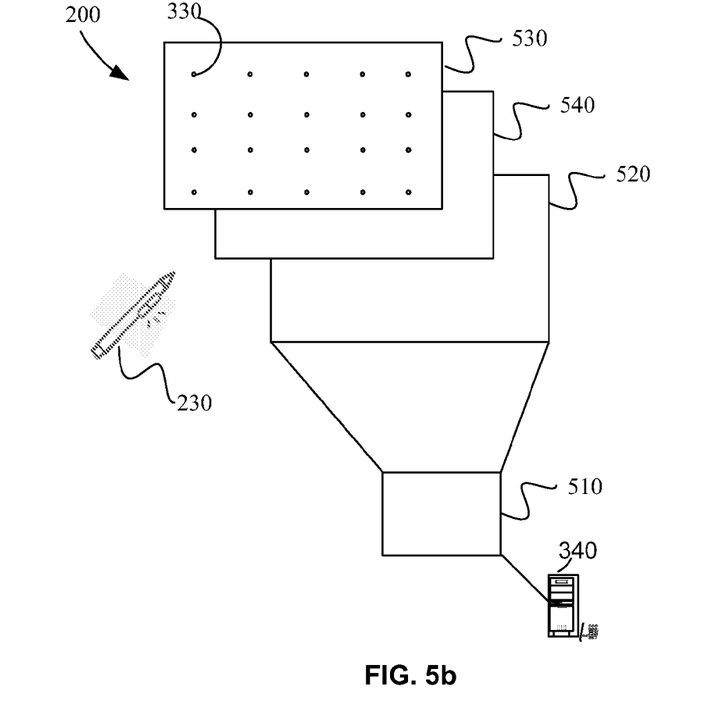

With reference to FIG. 5b, in another exemplary embodiment, drawing desk 200 employs touch technology. In particular, touchscreen 540 is placed between glass plate 520 and sheet 530. Touchscreen 540 may employ any touchscreen technology that is effective through a barrier, such as sheet 530. For example, touchscreen 540 may be a resistive touchscreen, a capacitive touchscreen, a surface acoustic wave touchscreen, an infrared touchscreen, an optical imaging touchscreen, dispersive signal touchscreen, acoustic pulse recognition touchscreen, or the like.

Alternatively, similarly to the exemplary embodiment described above in conjunction with FIG. 3b, touchscreen sensors (e.g., infrared sensors, acoustic sensors, dispersive signal sensors, or the like) may be attached to the outside edges of drawing table 200. The sensors may emit and detect disruptions in LED beams, acoustic waves, mechanical energy, or the like to determine the location of an input device, which can be an animator's finger.

Also, similar to the exemplary embodiment described above, infrared ink dots 330 can be used in conjunction with touch technology. For example, infrared ink dots 330 can be imprinted on sheet 530 or touchscreen 540 to provide input to the projected image.

Figure 6A:
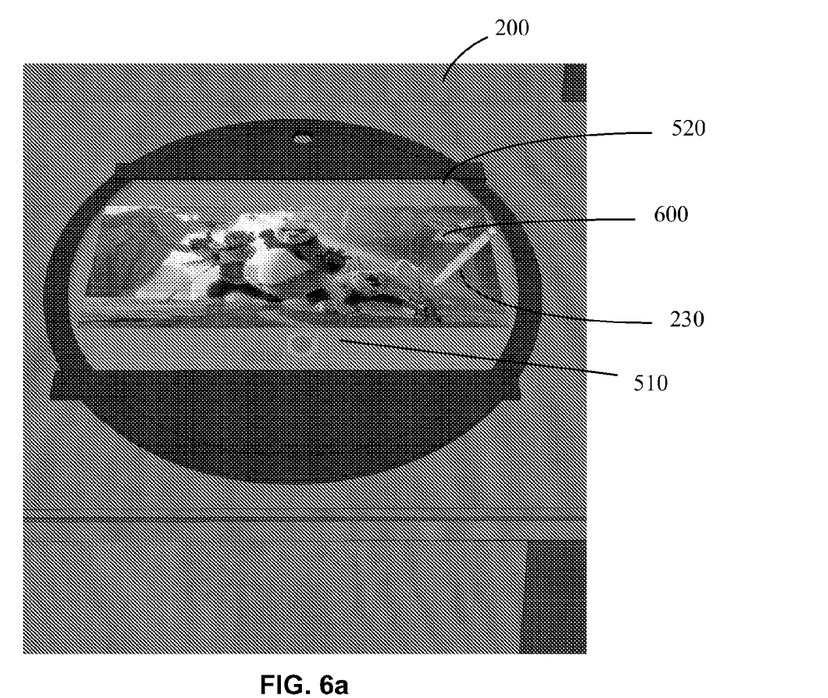
FIGS. 6a and 6a illustrate exemplary view of a system for creating or modifying digital content.
Figure 6B:
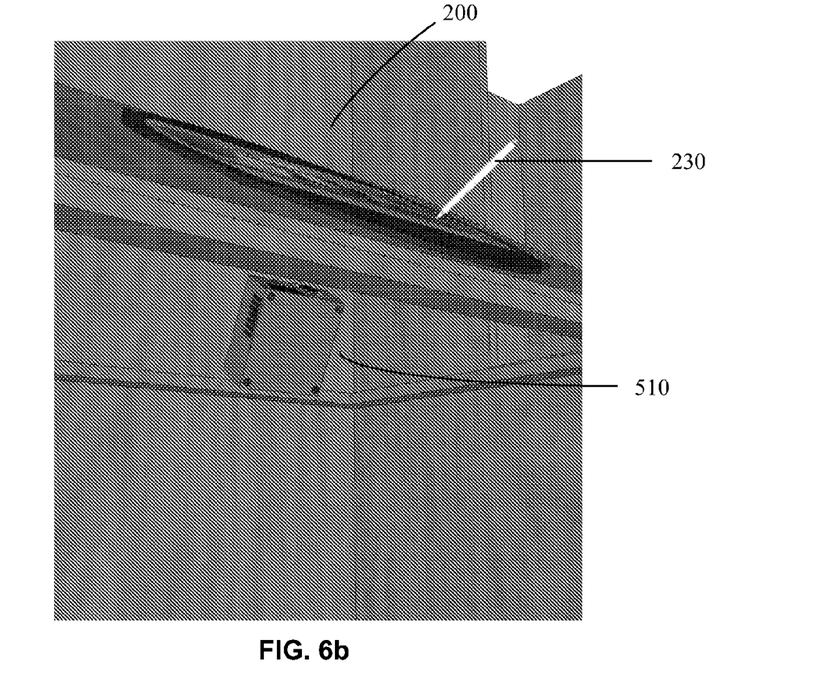

FIGS. 6a and 6b show additional views of drawing table 200 described in conjunction with FIGS. 5a and 5b. Projector 510 (see particularly FIG. 5b) is mounted below glass plate 520. Image 600 is projected onto glass plate 520 by projector 510. Stylus 230 may be used to draw additional details on image 600.

Figure 7:
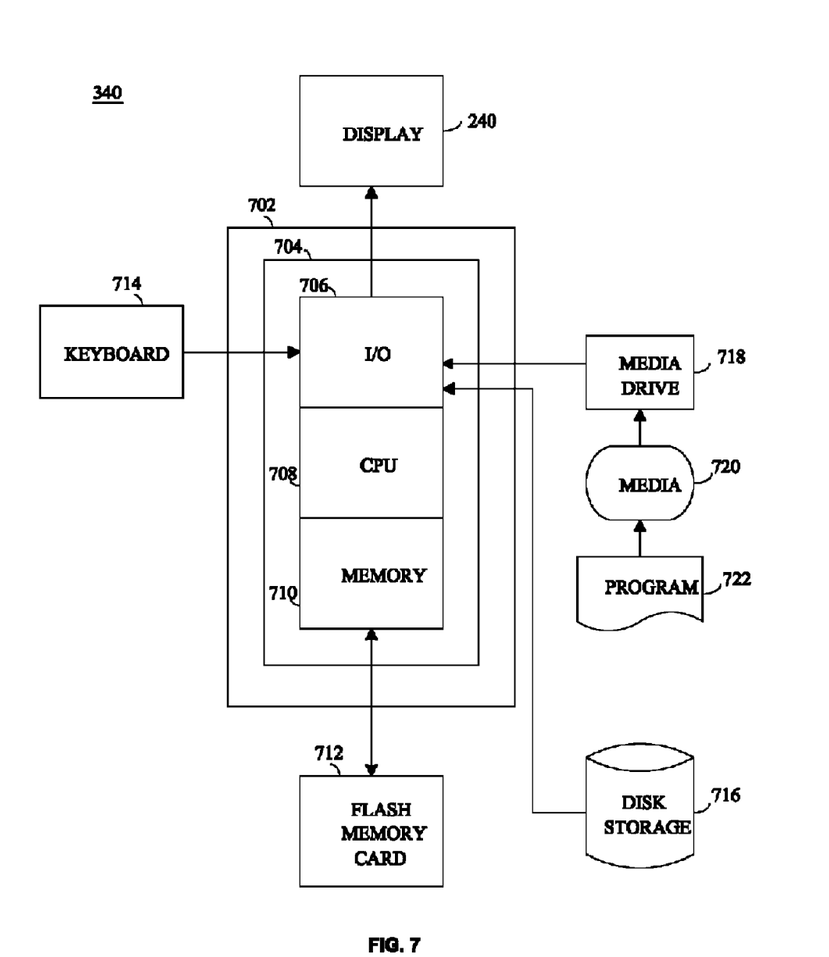
FIG. 7 illustrates an exemplary computing system.

FIG. 7 depicts components of computing system 340. In this context, computing system 340 may include, for example, a processor, memory, storage, and input/output devices (e.g., monitor, keyboard, stylus, drawing device, disk drive, Internet connection, etc.). However, computing system 340 may include circuitry or other specialized hardware for carrying out some or all aspects of the processes. In some operational settings, computing system 340 may be configured as a system that includes one or more units, each of which is configured to carry out some aspects of the processes either in software, hardware, or some combination thereof.

FIG. 7 depicts computing system 340 with a number of components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to display 240, a keyboard 714, a disk storage unit 716, and a media drive unit 718. The media drive unit 718 can read/write a computer-readable medium 720, which can contain programs 722 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A drawing table for an animator to hand create or modify a computer-generated image, comprising:
    a display having a top surface, wherein the display is configured to display a computer-generated image; and
    a fused fiber optic plate comprised of bundled, optical fibers,
        wherein the fused fiber optic plate has an input surface and an output surface, wherein the input surface of the fused fiber optic plate is optically bonded to the top surface of the display, and wherein, when the computer-generated image is displayed on the display, the fused fiber optic plate is configured to relay the computer-generated image from the input surface to the output surface.

2. The drawing table of claim 1, wherein the output surface of the fused fiber optic plate is imprinted with infrared dots arranged in a pattern, the infrared dots being configured to provide positional information to a stylus.

3. The drawing table of claim 2, wherein the stylus has an infrared camera configured to detect positional information of the infrared dots.

4. The drawing table of claim 2, wherein the stylus is configured to store the detected positional information of the infrared dots.

5. The drawing table of claim 2, wherein the stylus is configured to transmit the detected positional information of the infrared dots to a storage device, wherein the storage device is coupled to the stylus.

6. The drawing table of claim 2, wherein the tip of the stylus is coincident to a cursor on the computer-generated image.

7. The drawing table of claim 1, wherein the fused fiber optic plate is configured to protect the display and is in direct contact with the display.

8. The drawing table of claim 1, further comprising:
a plurality of touchscreen sensors coupled to the fused fiber optic plate.

9. The drawing table of claim 8, wherein the plurality of touchscreen sensors are infrared or acoustic touchscreen sensors.

10. The drawing table of claim 8, wherein the plurality of touchscreen sensors are infrared sensors configured to emit LED beams and detect disruptions of the LED beams.

11. The drawing table of claim 8, wherein the plurality of touchscreen sensors are acoustic sensors configured to emit acoustic waves and detect disruptions of the acoustic waves.

12. The drawing table of claim 8, wherein the plurality of touchscreen sensors are dispersive signal sensors configured to detect disruptions of mechanical energy.

13. A drawing table for an animator to hand create and modify a computer-generated image, comprising:
a projector configured to project a computer-generated image;
a glass plate having a top surface and a bottom surface, wherein the projector is configured to project the computer-generated image onto the bottom surface of the glass plate; and
a sheet coupled to the top surface of the glass plate, wherein the computer-generated image is projected onto the sheet from the projector through the glass plate.

14. The drawing table of claim 13, wherein the sheet is imprinted with infrared dots arranged in a pattern, and wherein the infrared dots are configured to provide positional information to a stylus.

15. The drawing table of claim 14, wherein the stylus comprises an infrared camera configured to detect positional information of the infrared dots.

16. The drawing table of claim 14, wherein the stylus is configured to store the detected positional information of the infrared dots.

17. The drawing table of claim 14, wherein the stylus is configured to transmit the detected positions of the infrared dots to a storage device, wherein the storage device is coupled to the stylus.

18. The drawing table of claim 14, wherein the tip of the stylus is coincident to a cursor on the computer-generated image.

19. The drawing table of claim 13, further comprising:
a touchscreen, wherein the touchscreen is located between the glass plate and the sheet.

20. The drawing table of claim 19, wherein the touchscreen is a resistive touchscreen, a capacitive touchscreen, or an optical imaging touchscreen.

21. The drawing table of claim 13, further comprising:
a plurality of touchscreen sensors coupled to the glass plate, wherein the plurality of sensors is arranged around the glass plate.

22. The drawing table of claim 21, wherein the plurality of touchscreen sensors is a plurality of infrared sensors configured to emit LED beams and detect disruptions of the LED beams.

23. The drawing table of claim 21, wherein the plurality of touchscreen sensors is a plurality of acoustic sensors configured to emit acoustic waves and detect disruptions of the acoustic waves.

24. The drawing table of claim 21, wherein the plurality of touchscreen sensors is a plurality of dispersive signal sensors configured to detect disruptions of mechanical energy.

* * * * *